Figure 1:
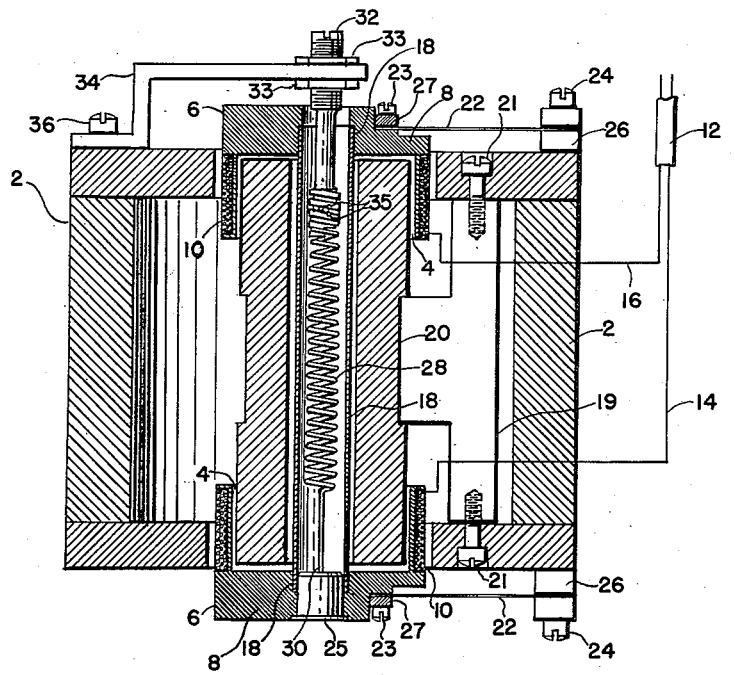

April 8, 1952     J. D. EISLER     2,591,795
VIBRATION DETECTOR
Filed Nov. 15, 1949

*INVENTOR.*
Joseph D. Eisler
BY Arthur McIlroy
ATTORNEY

Patented Apr. 8, 1952

2,591,795

UNITED STATES PATENT OFFICE 2,591,795

VIBRATION DETECTOR

Joseph D. Eisler, Tulsa, Okla., assignor to Stanolind Oil and Gas Company, Tulsa, Okla., a corporation of Delaware Application November 15, 1949, Serial No. 127,373

6 Claims. (Cl. 177—352)

1

The present invention relates to instruments for detecting seismic waves of the type used in earth exploration and is concerned particularly with a novel means of supporting and adjusting a helical spring which functions as a main supporting member for low frequency refraction seismometers employed for routine field use.

In the exploration for oil or other minerals by the seismic method, it is common practice to employ electromagnetic vibration detectors which may be constructed in a variety of ways. However, a feature common to all such equipment is that it contains a coil assembly on an iron core, or may be mounted movably around an iron core. All such detectors contain a permanent magnet or an electromagnet. The coil assembly is elastically suspended in the magnetic field usually by means of a thin leaf spring or springs affixed to either end thereof which tend to impart a parallel motion to the assembly and at the same time guide it and center the coil in the gap between the core and the magnet. The natural frequency of one type of the seismometer is wholly controlled by means of a helical spring, one end of which is attached to the coil assembly and the other end to the main body of the magnet. The purpose of such detectors is to convert minute ground motions into electrical currents or voltages which are usually amplified by means of a vacuum tube amplifier and recorded by means of moving coil oscillographs. The motions of the ground which must be observed are extremely small, frequently one-millionth of an inch, or less, and hence the voltages developed by the detector are correspondingly small.

Previously, both the leaf and helical springs employed in seismometers of the type herein concerned were constructed of a spring alloy; however, because of the density of such alloys and their low moduli of elasticity, these springs were considered to be unsatisfactory. Under actual operating conditions, this type of helical spring gave rise to a serious parasitic frequency which prevented the utilization of these seismometers in instances where the recordation of higher frequencies was desirable. Moreover, the leaf spring coil supports used in this type of seismometer in conjunction with the aforesaid helical spring were far from satisfactory inasmuch as the frequencies of such springs were not constant and hence it became necessary to adjust the frequency of each leaf spring after it was placed in the instrument. In order to eliminate the above-mentioned parasitic frequency, which was a function of the distributed mass of the spring itself and the spring

2 compliance, a lighter steel spring was substituted for the alloy spring designed to operate at a much higher stress. Owing to the fact that the density of steel is less than that of the alloy used and because the spring was stressed to a higher value, the natural frequency of the spring itself was well beyond the useful seismic frequency band. The use of a steel spring, however, presented a new problem in that it was extremely difficult to manufacture springs of this type having a relatively few turns and which would have a correct and predetermined spring constant. Thus, if one of such springs was made and found to have the desired spring constant, there was no means by which one could be assured that others subsequently could be manufactured having the same constant.

Accordingly, it is an object of my invention to provide a simple and accurate means for adjusting the constant of a helical spring so that substantially any desired frequency can be obtained. It is a further object of my invention to provide a novel means for supporting and adjusting a helical spring which functions as a main supporting member for low frequency seismometers. Another object is to provide a means whereby any irregularities inherent in the leaf spring coil supports employed in such seismometers are compensated for through the adjustment of said helical spring in accordance with my invention.

In overcoming the above and other difficulties characteristic of previous low frequency seismometers, I employ a steel or other suitable metal helical spring, one end of which is affixed to the coil assembly while the opposite end of the spring is wound into a helically grooved or threaded mandrel which is rotatably mounted on a support. By twisting the mandrel into the spring, a very accurate and adjustable spring constant can be readily established since any desired portion of the spring can thus be rendered inactive. After the required natural frequency of the seismometer is obtained, the spring wire is staked to the mandrel or the wire swedged thereto by closing a portion or portions of the mandrel grooves and thus locking the wire in position. Accordingly, by this means, a very easy and effective method of establishing the proper natural frequency of a seismometer within very close tolerances is provided.

Figure 2:
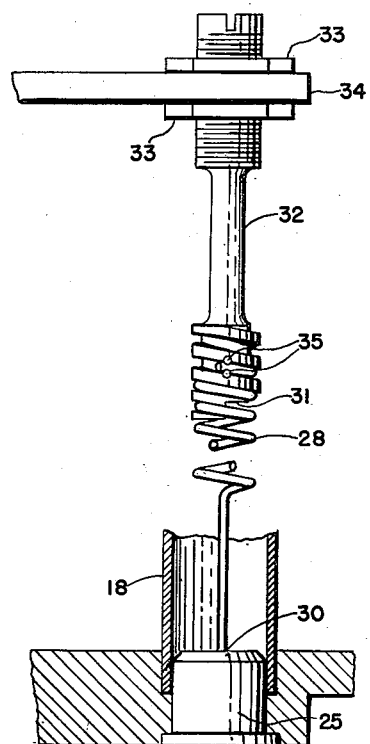

For a better understanding of my invention, reference should be made to the accompanying drawings in which Fig. 1 is a vertical sectional elevation through the instrument and Fig. 2 is an elevational view, partly in section, illustrating in detail an embodiment of the means provided by my invention whereby the desired frequency of the spring is obtained.

Referring to the drawings, the seismometer consists of a permanent magnet 2 having radial gaps 4 in which a moving coil assembly 6 is placed. This coil assembly comprises brass or other suitable non magnetic metal bobbins 8 around which are wound coils 10, preferably comprising several thousand turns of insulated wire and constituting the element of the transducer which converts the seismic waves into electromotive forces which are then fed through a detector cable 12 comprising leads 14 and 16 to suitable recording equipment. The coils 10 are held together by tube 18 which passes through soft iron core 20 held in place by supporting member 19 which in turn is maintained in a stationary position within the instrument through attachment to the main body of magnet 2 by means of screws 21. Two similar supporting members (not shown) spaced equidistant from one another and from member 19 are preferably employed to hold core 20 in place. The coil assembly 6 is suspended within the gaps 4 by two thin flat metal springs 22 secured to the main body of magnet 2 by means of screws 24 and lugs 26, said springs serving to impart a parallel motion to and guide coil assembly 6. The opposite ends of springs 22 are securely engaged to bobbins 8 by means of screws 23 and clamping plates 27. Helical spring 28 is housed within tube 18 and is attached to the lower end thereof at 30 by means of a suitable metal plug 25 into which the end of the spring is brazed or soldered. The upper end of spring 28 is affixed to helically grooved mandrel 32 by guiding the upper end of spring 28 into the lower grooves of mandrel 32 and thereafter turning the latter in a clockwise direction. Preferably, mandrel 32 is undercut at 31 in the manner shown in order to minimize the friction between the spring wire and the groove of the mandrel. When the proper constant of spring 28 has been obtained, a portion of the wire thereof is staked to mandrel 32 at 35 and the latter made stationary by means of lock nuts 33. Thereafter, no further adjustment of the instrument need be made. Mandrel 32 is inserted into a suitable opening in supporting arm 34 which is rigidly mounted to the main body of magnet 2 by means of screw 36. Vertical adjustment of mandrel 32 can be effected independently of rotation thereof by means of lock nuts 33 which by turning in the desired direction cause the mandrel to be raised or lowered at will with respect to supporting arm 34. By this expedient proper positioning of coils 10 in radial gaps 4 may be easily maintained. The distance between the helices on mandrel 32 is preferably less than the distance between the coils of spring 28 when the latter is subjected to the tension of coil assembly 6 in order that the spring when wound onto the mandrel will be compressed thereby providing better frictional force between the spring coils and the mandrel grooves. If desired, however, the distances between said helices may be greater or less than the distance between said coils. Thus, with the control means described above, the desired natural frequency of the elastically supported mass is achieved merely by adjusting the length of central spring 28 to the required constant. Moreover, with the adjustable spring design provided by my invention, leaf spring coil supports 22 do not have to be individually tuned in the assembly of the instrument.

From the foregoing, it is believed that the construction, operation, and numerous advantages of my spring constant regulating means and the use thereof in seismometers as taught herein will be apparent to those skilled in the art without further description and it is to be understood that various changes in size, shape, and minor details of construction may be resorted to without departing from the scope of my invention.

I claim:

1. In a vibration detector the combination comprising means for producing a magnetic field including a permanent magnet, a hollow ferromagnetic core in said field, a helical spring in the hollow portion of said core disposed longitudinally of said core's axis, and a movable coil assembly suspended within said field at least in part by means of said helical spring the lower end of which is secured to the lower portion of said coil assembly.

2. In a vibration detector the combination comprising means for producing a magnetic field including a permanent magnet, a hollow ferromagnetic core in said field, a helical spring in the hollow portion of said core disposed longitudinally of said core's axis, a movable coil assembly suspended within said field at least in part by means of said helical spring the lower end of which is secured to the lower portion of said coil assembly, a rotatably mounted threaded member secured to the opposite end of said spring by engaging the coils of said spring in the helical threads of said member, and means for vertical adjustment of said helically threaded member independent of the rotation thereof.

3. In a vibration detector the combination comprising means for producing a magnetic field including a permanent magnet, a hollow ferromagnetic core in and spaced centrally of said magnet, a helical spring in the hollow portion of said core disposed longitudinally of the axis of said core, a movable coil assembly suspended within said field at least in part by means of said helical spring the lower end of which is secured to the lower portion of said coil assembly, a rotatably mounted threaded member secured to the opposite end of said spring by engaging the coils of said spring in the helical threads of said member, the distance between the threads on said member being different from the distance between the helices of the spring when the latter is subjected to the tension of said coil, and means for vertical adjustment of said helically threaded member independent of the rotation thereof.

4. In a vibration detector the combination comprising means for producing a magnetic field including a permanent magnet, a coil assembly in said field comprising a pair of vertically spaced coils, a hollow ferromagnetic core separating said coils and lying therewithin, and a helical spring in the hollow portion of said core disposed longitudinally of said core's axis, said assembly being suspended in said field at least in part by means of said helical spring the lower end of which is secured to the lower portion of said assembly.

5. In a vibration detector the combination comprising means for producing a magnetic field including a permanent magnet, a coil assembly in said field comprising a pair of spaced coils connected by means of a hollow tube, a ferromagnetic core terminating within said coils and disposed about said tube, and a helical spring in said tube disposed longitudinally of said tube's axis, said assembly being suspended in said field at least in part by means of said helical spring the lower end of which is secured to the lower portion of said assembly.

6. In a vibration detector the combination comprising means for producing a magnetic field including a permanent magnet, a hollow ferromagnetic core in said field, a tube within said core, a pair of spaced coils about the ends of said core and held in position by said tube, and a helical spring in said tube disposed longitudinally of said tube's axis, said assembly being suspended in said field at least in part by means of said helical spring the lower end of which is secured to the lower portion of said assembly.

JOSEPH D. EISLER.

REFERENCES CITED

The following references are of record in the file of this patent:

UNITED STATES PATENTS

| Number | Name | Date |
| --- | --- | --- |
| 1,005,730 | Raber | Oct. 10, 1911 |
| 1,023,490 | Beck. et al. | Apr. 16, 1912 |
| 1,953,664 | Walker | Apr. 3, 1934 |
| 2,038,101 | Dudley | Apr. 21, 1936 |
| 2,062,784 | Green | Dec. 1, 1936 |
| 2,272,984 | Ritzmann | Feb. 10, 1942 |

FOREIGN PATENTS

| Number | Country | Date |
| --- | --- | --- |
| 245,805 | Great Britain | Jan. 20, 1927 |